United States Patent
Musacchio et al.

(10) Patent No.: US 11,242,871 B2
(45) Date of Patent: *Feb. 8, 2022

(54) CONTINUOUSLY VARIABLE OUTPUT LIQUID CHROMATOGRAPHY PUMP DRIVE

(71) Applicant: Waters Technologies Corporation, Milford, MA (US)

(72) Inventors: Jeffrey Musacchio, Sharon, MA (US); Michael Eggertson, Natick, MA (US); Joseph Michienzi, Plainville, MA (US)

(73) Assignee: WATERS TECHNOLOGIES CORPORATION, Milford, MA (US)

( * ) Notice: Subject to any disclaimer, the term of this patent is extended or adjusted under 35 U.S.C. 154(b) by 66 days.

This patent is subject to a terminal disclaimer.

(21) Appl. No.: 16/573,439

(22) Filed: Sep. 17, 2019

(65) Prior Publication Data

US 2020/0088221 A1 Mar. 19, 2020

Related U.S. Application Data

(60) Provisional application No. 62/732,635, filed on Sep. 18, 2018.

(51) Int. Cl.
*G01N 30/02* (2006.01)
*F15B 15/14* (2006.01)
(Continued)

(52) U.S. Cl.
CPC ............ *F15B 15/1409* (2013.01); *F15B 1/04* (2013.01); *F15B 15/18* (2013.01);
(Continued)

(58) Field of Classification Search
CPC ........ F15B 15/1409; F15B 1/04; F15B 15/18; F16H 37/0846; F16H 3/44; F16H 3/48; F16H 3/46; F16H 3/72; F16H 3/724; G01N 30/02; G01N 2030/027; G01N 2030/326; G01N 30/32
See application file for complete search history.

(56) References Cited

U.S. PATENT DOCUMENTS

| | | | |
|---|---|---|---|
| 3,922,115 A | 11/1975 | Coe et al. | |
| 5,935,035 A * | 8/1999 | Schmidt | B60K 6/445 475/5 |

(Continued)

FOREIGN PATENT DOCUMENTS

| | | |
|---|---|---|
| EP | 1437509 A2 | 7/2004 |
| WO | 2010139359 A1 | 12/2010 |

OTHER PUBLICATIONS

International Search Report and Written Opinion in related international patent application No. PCT/US19/051483, dated Jan. 8, 2020; 16 pages.

(Continued)

*Primary Examiner* — Justin Holmes
(74) *Attorney, Agent, or Firm* — Schmeiser, Olsen & Watts LLP; Victor J. Baranowski

(57) ABSTRACT

A liquid chromatography solvent pump includes at least one motor, a first piston, a second piston, and a continuously variable output drive system coupling the at least one motor to at least one of the first and second pistons. The first piston and the second piston are configured to deliver a flow of solvent in a liquid chromatography system.

18 Claims, 7 Drawing Sheets

(51) Int. Cl.
*F15B 1/04* (2006.01)
*F15B 15/18* (2006.01)
*F16H 37/08* (2006.01)
*G01N 30/32* (2006.01)

(52) U.S. Cl.
CPC ......... *F16H 37/0846* (2013.01); *G01N 30/02* (2013.01); *G01N 2030/027* (2013.01); *G01N 2030/326* (2013.01)

(56) References Cited

U.S. PATENT DOCUMENTS

| | | | |
|---|---|---|---|
| 9,316,216 B1 | 4/2016 | Cook et al. | |
| 2005/0095145 A1 | 5/2005 | Hiraku et al. | |
| 2005/0214130 A1 | 9/2005 | Yang | |
| 2010/0029428 A1* | 2/2010 | Abe | B60K 6/365 475/5 |
| 2012/0285558 A1* | 11/2012 | Witt | F04B 13/00 137/544 |
| 2013/0330209 A1 | 12/2013 | Joudrey | |
| 2017/0211662 A1 | 7/2017 | Okamoto et al. | |
| 2018/0149628 A1* | 5/2018 | Yamakawa | G01N 30/8651 |
| 2020/0088220 A1* | 3/2020 | Musacchio | F16H 3/02 |

OTHER PUBLICATIONS

International Search Report and Written Opinion in related international patent application No. PCT/US19/051507, dated Jan. 8, 2020; 17 pages.
Wikipedia: "Wikipedia: Transmission (mechanics)," Sep. 10, 2018, XP055653431, Retrieved from the Internet: URL:https://en.wikipedia.org/w/index.php?title=Transmission_(mechanics)&oldid=858845301 [retrieved on Dec. 17, 2019].
Non-Final Office Action in U.S. Appl. No. 16/573,311 dated Mar. 30, 2021.
International Preliminary Report on Patentability in PCT/US2019/051483 dated Apr. 1, 2021.
International Preliminary Report on Patentability in PCT/US2019/051507 dated Apr. 1, 2021.
Notice of Allowance in U.S. Appl. No. 16/573,311 dated Jul. 16, 2021.

* cited by examiner

CONTINUOUSLY VARIABLE OUTPUT LIQUID CHROMATOGRAPHY PUMP DRIVE

RELATED APPLICATIONS

This application is a non-provisional patent application claiming priority to U.S. Provisional Patent Application No. 62/732,635, filed Sep. 18, 2018, entitled "Continuously Variable Output Liquid Chromatography Pump Drive," which is incorporated herein by reference.

FIELD OF THE INVENTION

The invention relates generally to liquid chromatography systems. More particularly, the invention relates to liquid chromatography systems pump drive systems, and associated methods of use thereof.

BACKGROUND

Chromatography is a set of techniques for separating a mixture into its constituents. In a liquid chromatography system, one or more pumps take in and deliver a mixture of liquid solvents to a sample manager, where an injected sample awaits its arrival. Liquid chromatography pump systems require drive systems for driving the pumps and injecting solvents and/or samples. Existing drive systems for liquid chromatography systems are direct drive systems— i.e. coupled directly to a rotary to linear motion converter, with or without a gearbox. Current drive systems are designed to handle very specific flow rates and pressures. These drive systems are quickly de-rated as users operate outside the ideal range (i.e. if the flow rate is increased outside the ideal range, the pressure may decrease). For example, current drive systems are outfitted with large motors to handle high end speeds and loads. However, these large motor systems suffer in flow resolution when they are run at lower speeds. Because motors run more precisely and accurately within the designed ranges, when a motor is asked to perform outside its ideal range, the precision and resolution of the flow rate and pressure output will suffer.

Thus, improved liquid chromatography systems including pump drive systems, and associated methods of use and assembly thereof, would be well received in the art.

SUMMARY

In one embodiment, a liquid chromatography solvent pump comprises: at least one motor; a first piston; a second piston; and a continuously variable output drive system coupling the at least one motor to at least one of the first and second pistons, wherein the first piston and the second piston are configured to deliver a flow of solvent in a liquid chromatography system.

Additionally or alternatively, the continuously variable output drive system includes a gearbox configured to provide a continuously variable output ratio between at least one input from the at least one motor and an output delivered to at least one of the first piston and the second piston.

Additionally or alternatively, the at least one motor is a first motor and a second motor.

Additionally or alternatively, the gearbox includes a stage of gears comprising: a sun gear; a plurality of planet gears meshed with and surrounding the sun gear and configured to revolve around the sun gear; and a ring gear meshed with and surrounding the plurality of planet gears, wherein the plurality of planet gears are configured to revolve within the ring gear.

Additionally or alternatively, the first motor and the second motor are configured to operate at least one of the first piston and the second piston without reversing direction.

Additionally or alternatively, the first motor is configured to provide an input to the ring gear and wherein the second motor is configured to provide an input to the sun gear.

Additionally or alternatively, the liquid chromatography solvent pump further comprises a second stage of gears, the second stage of gears comprising: a second sun gear; a second plurality of planet gears meshed with and surrounding the second sun gear and configured to revolve around the second sun gear; a second ring gear meshed with and surrounding the second plurality of planet gears, wherein the second plurality of planet gears are configured to revolve within the second ring gear; and a second carrier connecting the second plurality of planet gears, wherein the carrier provides an input to the second sun gear, and wherein the second carrier provides an output to at least one of the first piston, the second piston, and a third sun gear of a third stage of gears.

Additionally or alternatively, the first piston is a primary piston and wherein the second piston is an accumulator piston and wherein the continuously variable output drive system couples the at least one motor to the accumulator piston.

Additionally or alternatively, the continuously variable output drive system, the first piston and the second piston are configured to deliver the flow at a rate and accuracy that enables use of the liquid chromatography solvent pump in both analytical and preparative liquid chromatography systems.

Additionally or alternatively, the continuously variable output drive system, the first piston and the second piston are configured to deliver the flow at a rate and accuracy that enables use of the liquid chromatography solvent pump in liquid chromatography systems having chromatographic columns greater than or equal to 1.5 mm and systems having chromatographic columns less than or equal to 0.4 mm.

Additionally or alternatively, the variable output drive system, the first piston and the second piston are configured to deliver accurate flow rates equal to or greater than 1500 microliter per minute and equal to or less than 1 microliter per minute.

Additionally or alternatively, the liquid chromatography solvent pump further comprises a carrier connecting the plurality of planet gears, wherein the carrier comprises an output from the plurality of planet gears.

In another embodiment, a method of pumping solvent in a liquid chromatography system, the method comprises: providing a liquid chromatography solvent pump comprising a continuously variable output drive system coupling at least one motor and at least one piston, the continuously variable output drive system comprising a gearbox; and continuously varying the output from the gearbox to the at least one piston.

Additionally or alternatively, the method includes delivering a flow of solvent in a liquid chromatography system by the at least one piston with a flow rate determined at least partially by the output.

Additionally or alternatively, the method includes using the liquid chromatography solvent pump in an analytical liquid chromatography system; and using the liquid chromatography solvent pump in a preparative liquid chromatography system.

Additionally or alternatively, the liquid chromatography solvent pump further includes: a first motor; and a second motor, and wherein the gearbox further includes: a sun gear; a plurality of planet gears meshed with and surrounding the sun gear and configured to revolve around the sun gear; and a ring gear meshed with and surrounding the plurality of planet gears, wherein the plurality of planet gears are configured to revolve within the ring gear, the method further comprising: providing, with the first motor, an input to the ring gear; and providing, with the second motor, an input to the sun gear.

Additionally or alternatively, the liquid chromatography solvent pump further includes: a first motor; and a second motor, and wherein the gearbox further includes: a sun gear; a plurality of planet gears meshed with and surrounding the sun gear and configured to revolve around the sun gear; and a ring gear meshed with and surrounding the plurality of planet gears, wherein the plurality of planet gears are configured to revolve within the ring gear, the method further comprising: operating, with the first motor and the second motor, at least one of the first piston and the second piston without reversing direction by the first motor and the second motor.

Additionally or alternatively, the method further includes delivering, by the at least one piston, a flow of solvent in a liquid chromatography system having a chromatographic column greater than or equal to 1.5 mm; and delivering, by the at least one piston, a flow of solvent in a liquid chromatography system having a chromatographic column less than or equal to 0.4 mm.

Additionally or alternatively, the method further includes delivering, by the at least one piston, a flow of solvent at a rate greater than or equal to 1500 microliters per minute; and delivering, by the at least one piston, a flow of solvent at a rate less than or equal to 1 microliters per minute.

In another embodiment, a liquid chromatography system comprises: a solvent delivery system, including: a pump comprising: at least one motor; a first piston; a second piston; and a continuously variable output drive system coupling the at least one motor to the first and second pistons, wherein the first piston and the second piston are configured to deliver a flow of solvent in a liquid chromatography system; a sample delivery system in fluidic communication with solvent delivery system; a liquid chromatography column located downstream from the solvent delivery system and the sample delivery system; and a detector located downstream from the liquid chromatography column.

BRIEF DESCRIPTION OF THE DRAWINGS

The above and further advantages of this invention may be better understood by referring to the following description in conjunction with the accompanying drawings, in which like reference numerals indicate like elements and features in the various figures. For clarity, not every element may be labeled in every figure. The drawings are not necessarily to scale, emphasis instead being placed upon illustrating the principles of the invention.

DETAILED DESCRIPTION

Reference in the specification to "one embodiment" or "an embodiment" means that a particular feature, structure or characteristic described in connection with the embodiment is included in at least one embodiment of the teaching. References to a particular embodiment within the specification do not necessarily all refer to the same embodiment.

The present teaching will now be described in more detail with reference to exemplary embodiments thereof as shown in the accompanying drawings. While the present teaching is described in conjunction with various embodiments and examples, it is not intended that the present teaching be limited to such embodiments. On the contrary, the present teaching encompasses various alternatives, modifications and equivalents, as will be appreciated by those of skill in the art. Those of ordinary skill having access to the teaching herein will recognize additional implementations, modifications and embodiments, as well as other fields of use, which are within the scope of the present disclosure as described herein.

The present invention relates to liquid chromatography pump drive systems, and methods of use thereof. Disclosed herein are pump drive systems including one or motors, or other device that creates a mechanical rotation on a drive system. The liquid chromatography pump drive systems described herein include a gearbox that provides for various input-to-output ratios to be achieved between the rotation of the drive system and the output that is provided to the pump(s). In some embodiments, two motors may be provided—one may provide a first input to a sun, planet or ring gear, and the other may provide a second input to another of the sun, planet or ring gear. The gearboxes described herein include one or more planetary gear systems configured to create various input-to-output conversion ratios. One or more stages of planetary gear systems are contemplated to achieve varying possible input-to-output ratios. The two motors may be operated independently to provide for continuously variable outputs across a wide range. As a result of the various outputs achieved by the drive systems, embodiments of the invention described herein may allow for a single pump and pump drive system to accommodate various liquid chromatography systems utilizing various column dimensions. Further, embodiments of the invention described herein may allow for the same pump and pump drive system to accommodate both preparative and analytical chromatography techniques. The pump drive systems described herein allow for high accuracy and flow resolution at various drastically disparate flow rates, across a wide continuous range.

Figure 1:
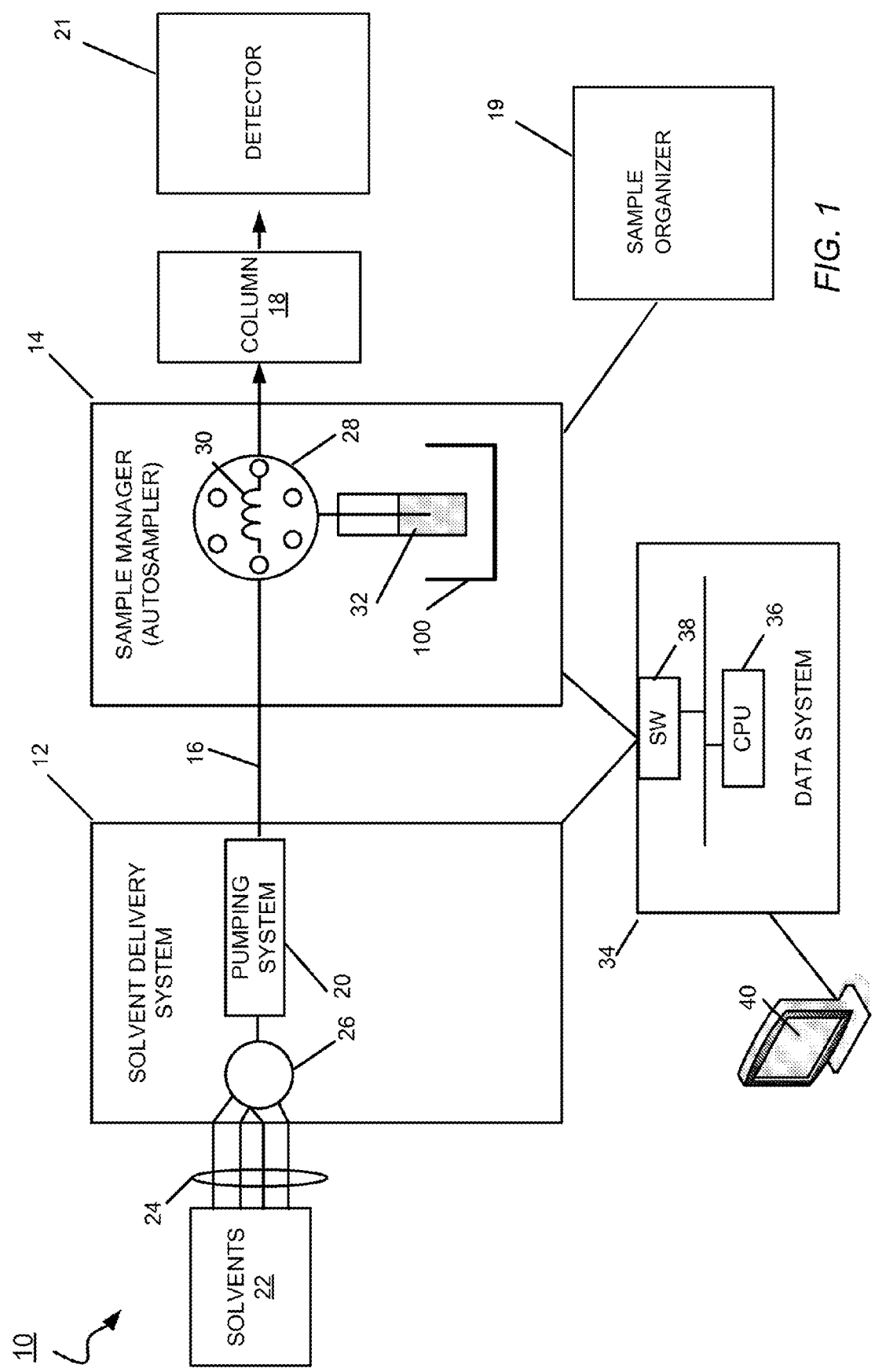
FIG. 1 depicts a schematic view of a liquid chromatography system including a pumping system in accordance with one embodiment.

FIG. 1 depicts a schematic view of a liquid chromatography system that includes a solvent delivery system including the solvent reservoir filter of FIG. 1, in accordance with one embodiment. FIG. 1 shows an embodiment of a liquid chromatography system 10 for separating a mixture into its constituents. The liquid chromatography system 10 includes a solvent delivery system 12 in fluidic communication with a sample manager 14 (also called an injector or an autosampler) through tubing 16. The sample manager 14 is in fluidic communication with a chromatographic column 18 and in mechanical communication with a sample organizer 19. The sample organizer 19 may be configured to store samples and provide stored samples to the sample manager 14 using an automated, robotic, or other mechanical moving process. A detector 21 for example, a mass spectrometer, is in fluidic communication with the column 18 to receive the elution.

The solvent delivery system 12 includes a pumping system 20 in fluidic communication with solvent reservoirs 22 from which the pumping system 20 draws solvents (liquid) through tubing 24. In the embodiment shown, the pumping system 20 is embodied by a low-pressure mixing gradient pumping system. In the low-pressure gradient pumping system, the mixing of solvents occurs before the pump, and the solvent delivery system 12 has a mixer 26 in fluidic communication with the solvent reservoirs 22 to receive various solvents in metered proportions. This mixing of solvents (mobile phase) composition that varies over time (i.e., the gradient). In other embodiments, the liquid chromatography system 10 may be a high-pressure mixing system.

The pumping system 20 is in fluidic communication with the mixer 26 to draw a continuous flow of gradient therefrom for delivery to the sample manager 14. Examples of solvent delivery systems that can be used to implement the solvent delivery system 12 include, but are not limited to, the ACQUITY Binary Solvent Manager and the ACQUITY Quaternary Solvent Manager, manufactured by Waters Corp. of Milford, Mass.

The sample manager 14 may include an injector valve 28 having a sample loop 30. The sample manager 14 may operate in one of two states: a load state and an injection state. In the load state, the position of the injector valve 28 is such that the sample manager loads the sample 32 into the sample loop 30. The sample 32 is drawn from a vial contained by a sample vial carrier or any device configured to carry a sample vial such as a well plate, sample vial carrier, or the like. In the injection state, the position of the injector valve 28 changes so that the sample manager 14 introduces the sample in the sample loop 30 into the continuously flowing mobile phase from the solvent delivery system. The mobile phase thus carries the sample into the column 18. In other embodiments, a flow through needle (FTN) may be utilized instead of a Fixed-Loop sample manager. Using an FTN approach, the sample may be pulled into the needle and then the needle may be moved into a seal. The valve may then be switched to make the needle in-line with the solvent delivery system.

The liquid chromatography system 10 may further include a data system 34 that is in signal communication with the solvent delivery system 12, the sample manager 14 and/or the sample organizer 19. The data system 34 may include a processor 36 and a switch 38 (e.g. an Ethernet switch) for handling signal communication between the solvent delivery system 12, the sample manager 14, and the sample organizer 19, and otherwise controlling these components of the liquid chromatography system 10. A host computing system 40 is in communication with the data system 34 by which a technician can download various parameters and profiles (e.g., an intake velocity profile) to the data system 34.

Figure 2:
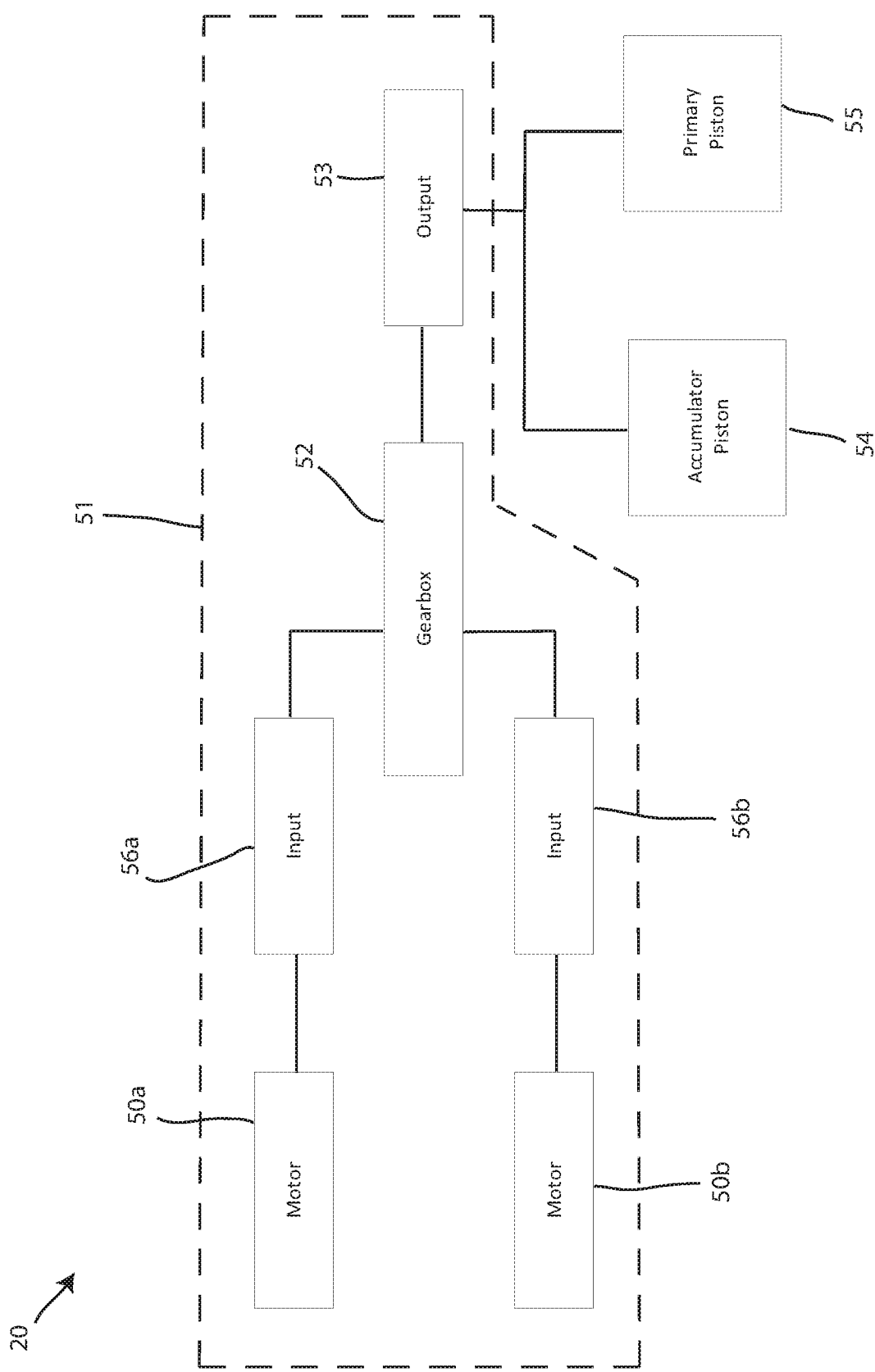
FIG. 2 depicts a schematic view of the pumping system of FIG. 1 in accordance with one embodiment.

FIG. 2 depicts a schematic view of the pumping system 20 in accordance with one embodiment. While the pumping system 20 of FIG. 2 is shown included in the liquid chromatography system 10 of FIG. 1, the pumping system 20 may also be applicable to any liquid chromatography system, such as High-Performance Liquid Chromatography systems (HPLC), Ultra Performance Liquid Chromatography systems (UPLC), Ultra High Performance Liquid Chromatography systems (UHPLC) or the like. The pumping system 20 may be applicable to both analytical and preparative liquid chromatography systems. Due to the advantages of the structure and/or methodology described herein, the pumping system 20 may be capable of operating with the precision, resolution, flow rates, and/or pressures necessary under various types of liquid chromatography systems. Thus, it is contemplated that, because of the varying output ratios, the same pumping system incorporating some or all aspects of the present disclosure may be configured to operate with both preparative and analytical liquid chromatography systems. It is further contemplated that the same pumping system incorporating some or all aspects of the present disclosure may be configured to operate with analytical liquid chromatography systems with 2000 microliter per minute flowrates, or for smaller nano-flow or micro-flow columns having much lower flow rates of less than 100 microliters per minute.

The pumping system 20 shown includes a continuously variable output drive system 51 that includes a first motor 50a, a second motor 50b, a first input 56a connecting the first motor 50a to a gearbox 52, and a second input 56b connecting the second motor 50b to the gearbox 52. The gearbox 52 is connected to an output 53 that is connected to an accumulator piston 54 and a primary piston 55. Herein, "continuously variable" means a drive system that includes the ability to change the input-to-output gear ratio without steps, a clutch, or the like, thereby providing the ability to change seamlessly between a range of effective gear ratios. It may be possible for the continuously variable drive system 51 to include a clutch to accommodate certain functionality, but whatever the embodiment, it is possible to change the continuously variable drive system 51 gear ratio in ways which do not utilize any provided clutch or clutches, as described herein below. Further, the output 53 of the gearbox 52, while shown connected to both the accumulator piston 54 and the primary piston 55, may also be connected to only a single one or the other of the accumulator piston 54 or the primary piston 55. For example, the gearbox 52 may provide an output only to the accumulator piston 54 while another motor (not shown) may provide power to the primary piston. The other motor may or may not include a gearbox similar or the same as the gearbox 52. It is therefore contemplated that a single gearbox 52 may be provided for providing varying output ratios to one or the other of the accumulator piston 54 and the primary piston 55.

The continuously variable output drive system 51 may be configured to provide a large continuous plurality of output ratios and rotational velocities for the output 53. This large continuous plurality of output ratios and rotational velocities may provide a much larger working output range than the motors 50a, 50b are configured to provide through direct output. For example, the motors 50a, 50b may be configured to each provide a working output range between 50 and 200 rpm. Outside of this range, the motors 50a, 50b may be inefficient, provide poor or unacceptable accuracy, precision, resolution, or the like. With this 150 rpm range of rotational velocities provide by the motors, the continuously variable drive system 51 may be configured to provide rpms as low as 1 rpm and as high as 1500 rpm, for example, within the working output range of the motors 50a, 50b.

The rotational velocity of the output 53 may be dependent on the rotational velocity of the first input 56a from the first motor 50a and the rotational velocity of the second input 56b from the second motor 50b. The continuous range of the output 53 may be dependent on the working range of the first input 56a of the first motor 50a and the second input 56b from the second motor 50b. For example, the first motor 50a and the second motor 50b may each include ideal working rotational velocity ranges between 50 and 200 rotations per minute (rpm).

The output 53 is shown extending from the gearbox and is configured to convert rotational motion from the first and second motors 50a, 50b and gearbox 52 into linear motion used to drive the accumulator 54 and primary pistons 55. In one embodiment, the output 53 may be rotary motion to linear via a ball screw. In another embodiment, the output 53 may be a shaft with a plurality of driving cams attached thereto which integrate with the accumulator piston 54 and primary piston 55 to provide linear motion in the pistons 54, 55. The output 53 may be configured to allow for the pistons 54, 55 to operate in tandem: when one piston fills, the other delivers. The output 53 and piston 54, 55 configuration may be capable of providing a constant flow and pressure output from the pumping system 20.

The primary piston 55 and the accumulator piston 54 may be configured to pump solvent fluid into the liquid chromatography system 10. The primary piston 55 and the accumulator piston 54 may be configured to operate in tandem and may both be driven by the output 53 from the gearbox 52. The primary piston 55 may be configured to deliver flow at the desired flow rate during the compression stroke of the primary piston 55. During the intake stroke of the primary piston 55, the accumulator piston 54 may deliver the compression stroke at double the desired flow rate. During the compression stroke of the accumulator piston 54, half of the flow delivered by the accumulator piston 54 may be provided to the chamber of the primary piston while the other half maintains the desired flow rate. This may be configured to maintain a constant desired flow rate and pressure by the pumping system 20.

While the accumulator piston 54 and primary piston 55 may be positioned in series along a fluid path, the gearbox 52 described herein may be applicable to two piston pumps where pistons are placed in parallel. Still further, embodiments and aspects of the gearbox 52 described herein may be applicable to various other fluid pump designs, both in and out of the field of liquid chromatography, along with liquid chromatography syringes.

Figure 3:
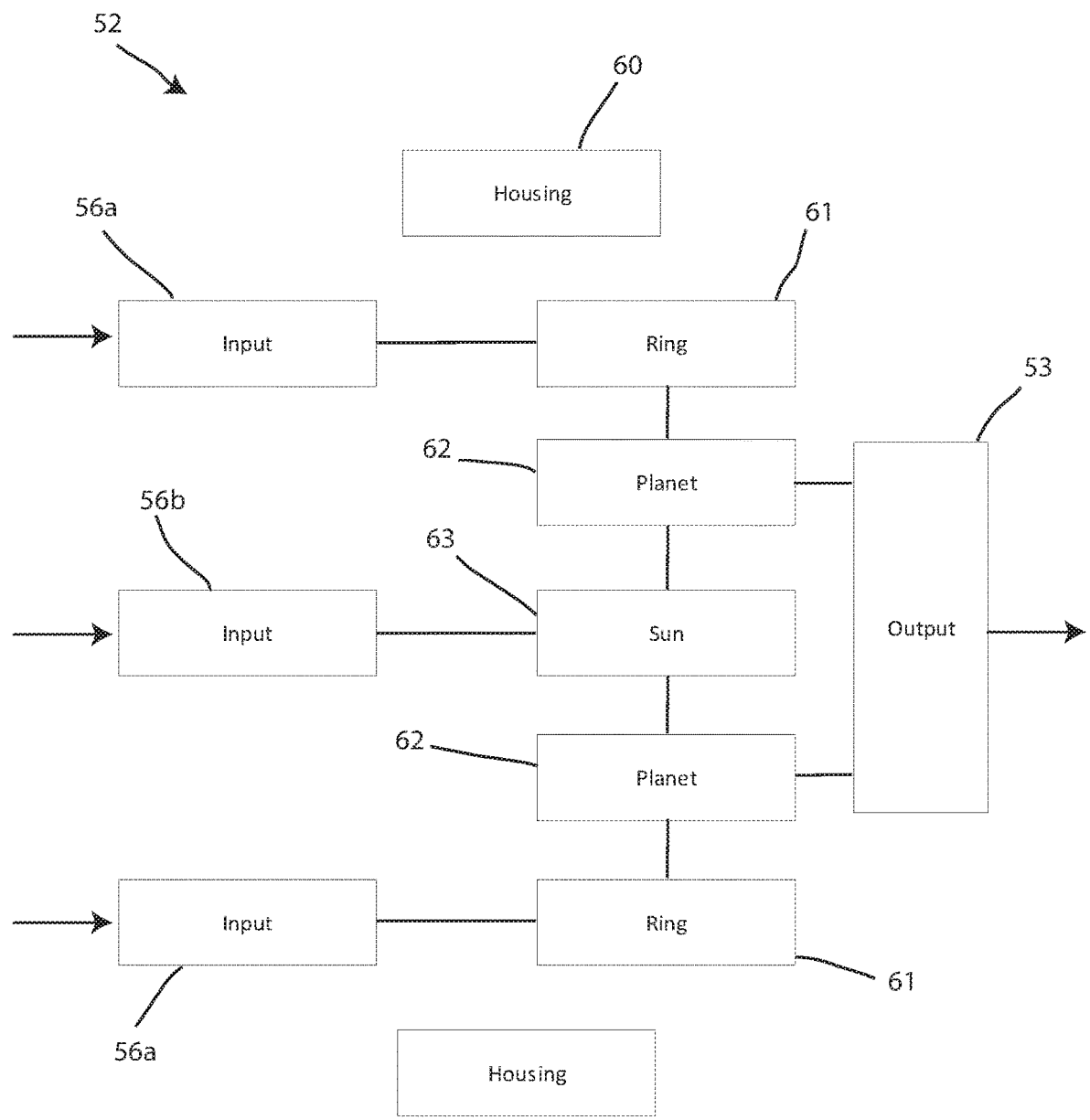
FIG. 3 depicts a schematic view of a gearbox of the pumping system of FIGS. 1 and 2 in accordance with one embodiment.

FIG. 3 depicts a first schematic view of the gearbox 52 of the pumping system 20 in accordance with one embodiment. The gearbox 52 may include a housing 60 surrounding a ring gear 61, a planet gear system 62, and a sun gear 63. The planet gear system 62 includes a plurality of separate planet gears. The planet gear system 62 is meshed with and surrounding the sun gear 63. The planet gear system 62 is configured to rotate about the sun gear 63. The ring gear 61 may be meshed with and surrounding the planet gear system 62 such that the planet gear system 62 is configured to rotate about the ring gear 62. A first input 56a is configured to provide rotational motion to the ring gear 62, while a second input 56b is configured to provide rotational motion to the sun gear 63. The planet gear system 62 may be attached or otherwise connected to the output 53. Thus, whatever the rotational velocity of the planet gear system 62 may be the rotational output 63 of the gearbox 52.

In this embodiment, the housing 60 is a fixed housing. The housing 60 is configured to preventing movement of the ring gear 62 when the ring gear 62 is meshed with the housing 60. When the housing 60 becomes meshed with, engaged with, or otherwise attached to the ring gear 62, the ring gear 62 is prevented from movement. This may be desirable in operating circumstances when the desired or needed output 53 of the gearbox 52 is within the ideal working rotational velocity range of one of the motors 50a, 50b. When engaged with the ring gear 62, the housing 60 converts the gearbox 52 into a single-input gearbox having a single one of the driving motors 50a, 50b in operation and driving the gearbox 62. In this state, the gearbox 52 provides a single input-to-output gear ratio between the input 56b and the output 53.

In still other operational embodiments, the input 56a may be brought to zero without the attachment or engagement of the housing 60 to the ring gear 61. In this state, a clutch or other holding mechanism may hold the planet gear system 62 fixed relative to the sun gear 63. In this state, the gearbox 52 provides a 1:1 input to output gear ratio between the input 56b and the output 53—rotation of the sun gear 63 by the second input 56b provides equivalent rotation to each of the planet gear system 62 and the ring gear 61.

In the embodiment shown, the planet gear system 62 rotates about the sun gear 63 at a rate that depends on the number of teeth of the sun gear 63 and the ring gear 62, the rotational speed of the ring gear 61 provided by the first input 56a from the first motor 50a, and the rotational speed of the sun gear 63 provided by the second input 56b from the second motor 50b according to the following formula:

$$\Omega_{planet} = (\Omega_{sun}(n_{sun}) + \Omega_{ring}(n_{ring}))/(n_{ring} + n_{sun})$$

where $\Omega$ is rotational velocity and n is the number of teeth. Thus, the rotational velocity of the planet gear system 62 and the output 53 may be different than the input velocities of the sun and ring gears 61, 63. The output 53 can be tailored to any specific output rotational velocity within the working range of the system to a high degree of precision.

As shown in FIG. 3, the output 53 is attached to the planet gear system 62. The output 53 may be any carrier interface that provides rotational motion. For example, the output 53 may be a carrier that attaches to, or otherwise integrates with, each of the plurality of planet gears of the planet gear system 62. In the case that the planet gear system 62 includes three planet gears, the output 53 may be a carrier fixture that includes three extending prongs fitting each into a center of each of the three planet gears. The base of the fixture may be configured to attach to the cam shaft of the output 53. Whatever the embodiment, the output 53 may take the rotation of the planet gears about the sun gear 63 and provide this rotational motion in a manner that may be converted into the linear motion of the pistons 54, 55.

In one embodiment, the gearbox 52 may be configured to provide output ratios that are capable of facilitating operation of the pumping system 20 with liquid chromatography systems having columns of varying diameters. For example, the gearbox 52 may be configured to provide output ratios capable of facilitating operation of the pumping system 20 with columns having diameters of 2.1 millimeters, 1 millimeter, 0.3 millimeters, and/or 0.15 millimeters. To accommodate the spread of the output ranges required by each of these four systems, the gearbox 52 may be configured to provide output ratios that span between 1:1 of a single motor input to about 1:1080 or more of a single motor input. To accommodate the spread of output ranges required by each of the 2.1 millimeter column and the 1 millimeter column, the gearbox 52 may be configured to provide output ratios that span between 1:1 of a single motor input to about 1:9 or more of a single motor input. To accommodate the spread of output ranges required by each of the 2.1 millimeter system, the 1 millimeter column, and the 0.3 millimeter column, the gearbox 52 may be configured to provide output ratios that span between 1:1 of a single motor input to about 1:405 or more of a single motor input. In each of the above examples, the gearbox 52 may be configured to provide many output ratios within the working range provided for by the gearbox 52. For example, in the case of a span of ranges between 1:1 to 1:9, the gearbox 52 may also be configured to provide individual additional output ratios of 1.1, 1.2, 1.3, 1.4, 1.5, 1.6, 1.7, 1.8, and 1.9. The gearbox 52 may have enough settings that hundreds or even thousands of output ratios may be provided that span between 1.1 and 1.9. Thus, the gearbox 52 may provide the ability of the pumping system 20 to be operable on a plurality of different columns without changing the motor 50. In various other embodiments, any output ratio spread may be provided by varying the number of teeth in each of the ring gear 61, planetary gear system 62, and sun gear 63.

With the gearbox 52, embodiments of the pumping system 20 may be configured to deliver a flow rate of fluid equal to or greater than 1500 microliters per minute while also being configured to deliver a flow rate of fluid equal to or less than 1 microliter per minute in a accuracy manner, while being able to deliver continuously variable flow rates within that range. In other embodiments, the pumping system 20 may be configured to deliver a flow rate of fluid equal to or greater than 750 microliters per minute while also being configured to deliver a flow rate of fluid equal to or less than 5 microliters per minute in a high accuracy manner, while being able to deliver continuously variable flow rates within that range. In still other embodiments, the pumping system 20 may be configured to deliver a flow rate of fluid equal to or greater than 1000 microliters per minute while also being configured to deliver a flow rate of fluid equal to or less than 2 microliters per minute in a high accuracy manner, while being able to deliver continuously variable flow rates within that range. These examples are meant to be exemplary and various other working ranges are contemplated.

In one exemplary embodiment where the gearbox 52 provides an input-to-output ratio of 1:9, the max flow provided may be 2500 microliters per minute. At this operational flow rate, the resolution may be 13 nanoliters per motorstep. In another exemplary embodiment where the gearbox provides an input-to-output ratio of 1:1080, the max flow may be 20,000 microliters per minute. At this operational flow rate, the resolution may be 0.1 nanoliters per motorstep. It should be understood that these maximum flow rates and resolutions are exemplary and that the principles of the invention may be applied to create liquid chromatography pump systems capable of providing accurate flows of various rates and resolutions. In particular, the pumping system 20 is configured to provide a continuous range of working flow rates between a minimum flow rate and a maximum flow rate, by varying the input velocities provided by the two motors 50a, 50b. In various embodiments, the minimum flow rate may be 0.1% of the maximum flow rate. In other embodiments, the minimum flow rate may be 1% of the maximum flow rate. In still other embodiments, the minimum flow rate may be 10% of the maximum flow rate. In one example, the maximum revolutions per second of the motors 50a, 50b may each be 100 or more and the minimum may be less than one. For example, the maximum revolutions per second of the motor may be 95 and the minimum may be 0.15. The motors 50a, 50b may each be configured to be maintained within this working range at the various input-to-output ratios and flow rates provided by the pumping system 20.

Figure 4:
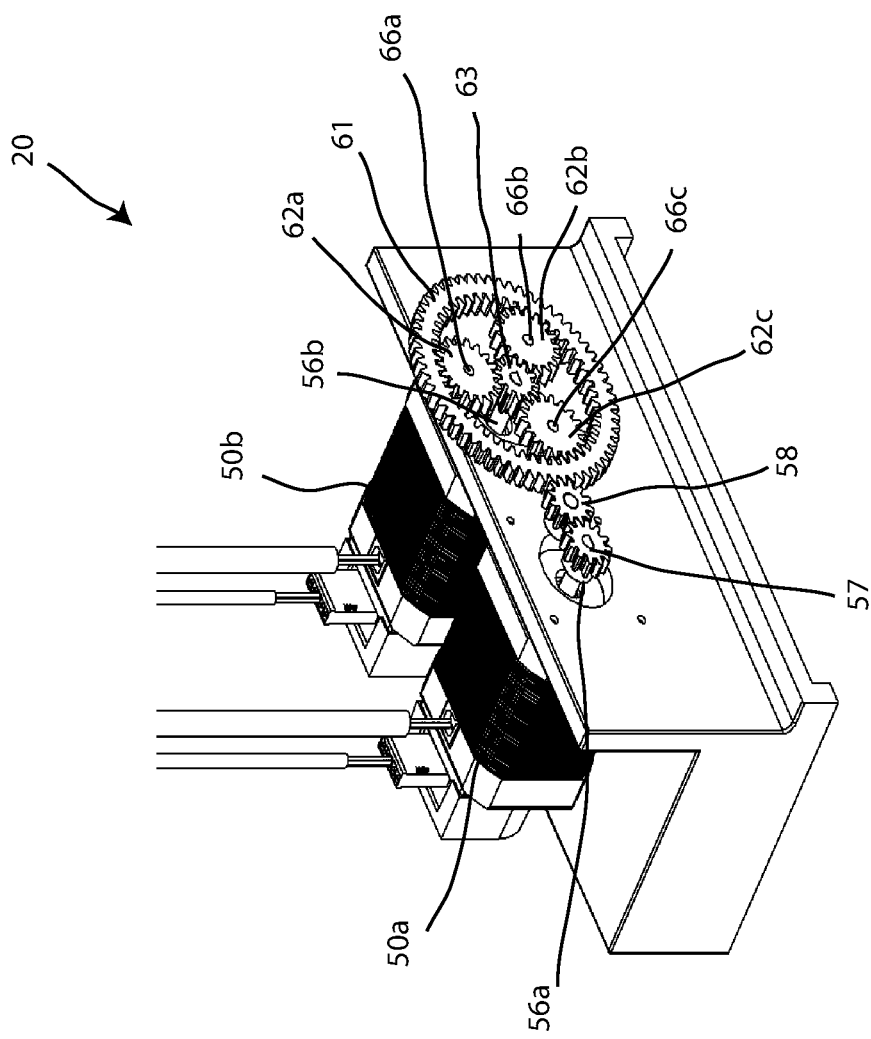
FIG. 4 depicts a perspective view of the pumping system of FIG. 1 in accordance with one embodiment.

FIG. 4 depicts a perspective view of the pumping system 20 including each of the first motor 50a and the second motor 50b in accordance with one embodiment. The two motors 50a, 50b are each duplicate motors having duplicate working output ranges, output powers, torques and the like in the embodiment shown. However, other embodiments contemplated include the two motors 50a, 50b being different and having different working output ranges, output powers, torques, and the like.

The first motor 50a and the second motor 50b may be configured to operate the accumulator piston 54 and/or the primary piston 55 in the pumping system 20 without reversing direction. For example, the motor 50a may provide a rotational velocity to the first input 56a in a first direction, and the motor 50b may provide a rotational velocity to the second input 56b in a second direction opposite to the first direction, the slowing down and speeding up of the counter rotation of the second input 56b may provide for a switch in rotational direction of the output 53 without changing direction of the inputs 56a, 56b or the motors 50a, 50b. This may prevent backlash and improve the life of the teeth of the various gears of the gearbox 52. In other embodiments, both inputs 56a, 56b and the motors 50a, 50b may be configured to provide rotational input in the same rotational direction.

While the embodiment shows the first motor 50a and the first input 56a attached to the ring gear 61 and the second motor and the second input 56b attached to the sun gear 63. In particular, the first input 56a is shown on the same axis as a drive gear 57. The drive gear 57 may be meshed with an idler gear 58. The idler gear 58 may be configured to change the direction of the ring gear 61 so that the ring gear 61 rotates in the same direction as the drive gear 57. In some embodiments, the idler gear 58 may be configured with a different number of teeth relative to the drive gear 57. In the embodiment shown the idler gear 58 includes the same number of teeth as the drive gear 58. The output 53 (not shown in FIG. 4) may be attached to the planetary gear system 62 in this embodiment. In other embodiments, the inputs 56a, 56b may be attached to any two of the ring gear 61, the planet gear system 62 and the sun gear 63, while the output 53 may be attached to the third. For example, the inputs 56a, 56b may be attached to the ring gear 61 and the planet gear system 62 and output 53 may be attached to the sun gear 63. The inputs 56a, 56b may be attached to the sun gear 63 and the planet gear system 62 and the output 53 may be attached to the ring gear 61.

As shown in FIG. 4, the planet gear system 62 includes three planet gears, a first planet gear 62a, a second planet gear 62b, and a third planet gear 62c. The planet gears 62a, 62b, 62c each include a corresponding center opening 66a, 66b, 66c which may receive a prong of the carrier or output 53 (not shown). This embodiment is exemplary, and more or less teeth for any of the sun gear 63, the planet gears 62a, 62b, 62c and ring gear 61 are contemplated. Further, more or less than three planet gears are contemplated in other embodiments.

FIG. 4 shows the first input 56a attached to the ring gear 61 and the second input 56b attached to the sun gear 63, the inputs 56a, 56b may be attachable in any manner that creates forced rotation of the ring gear 61 and sun gear 63 by operation of the output of the motors 50a, 50b, respectively. The inputs 56a, 56b are inputs of the gearbox 52 but may also be considered outputs of the motors 50a, 50b, respectively.

Figure 5:
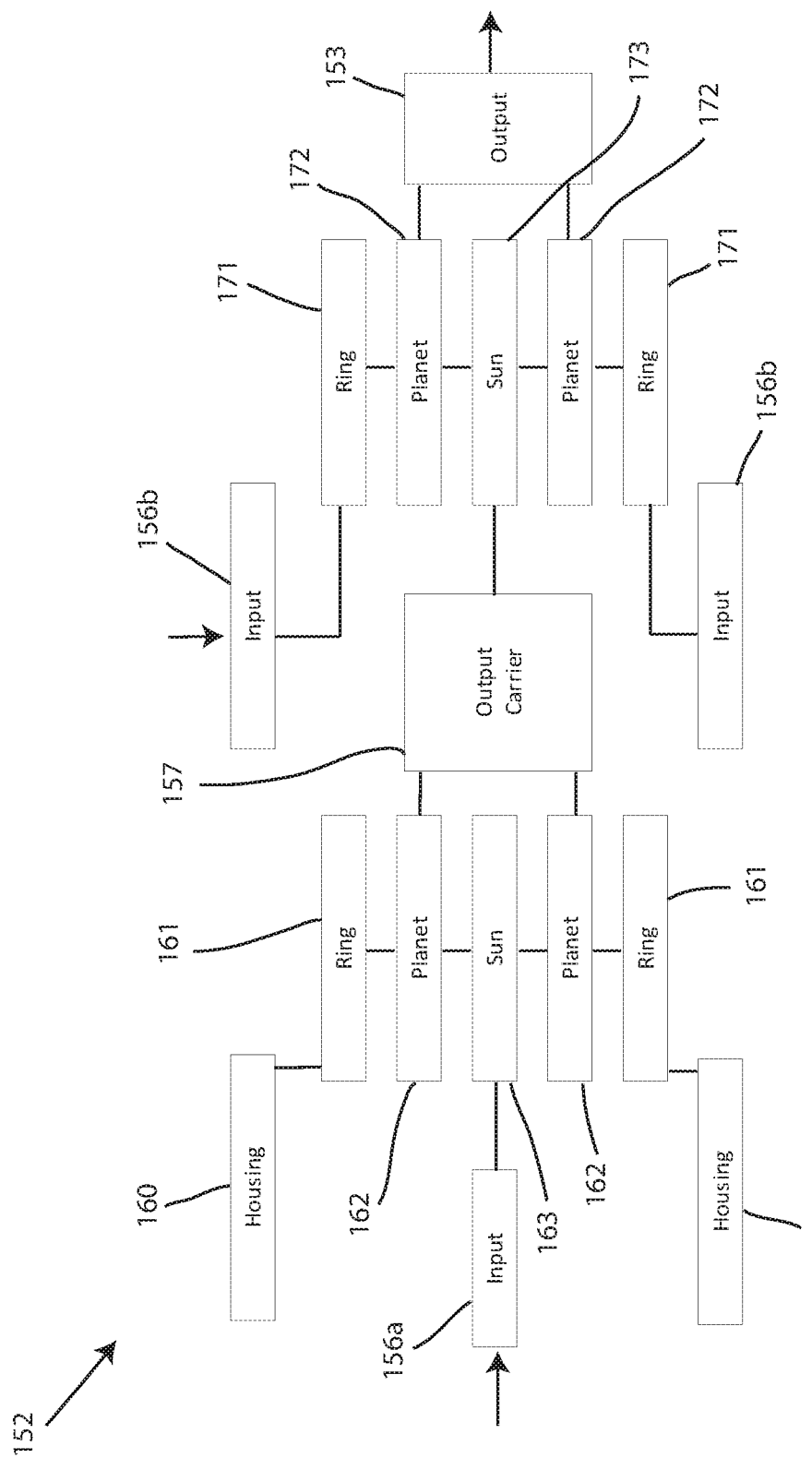
FIG. 5 depicts a schematic view of a two-stage solvent pump gearbox in accordance with one embodiment.

FIG. 5 depicts a schematic view of a two-stage solvent pump gearbox 152 in accordance with one embodiment. The two-stage solvent pump gearbox 152 may be similar to the gearbox 52 described hereinabove. However, the two-stage solvent pump gearbox 152 may include two separate planetary gear systems in succession rather than a single planetary gear system. The two-stage solvent pump gearbox 152 is shown including a housing 160, a first ring gear 161, a first planetary gear system 162, and a first sun gear 163. The first planet gear system 162 includes a first plurality of separate planet gears. The first planet gear system 162 is meshed with and surrounding the first sun gear 163. The first planet gear system 162 is configured to rotate about the first sun gear 163. The first ring gear 161 is meshed with and surrounding the first planet gear system 162 such that the first planet gear system 162 is configured to rotate about the first ring gear 162. The first ring gear 161 is shown meshed with or otherwise attached to the housing 160. The housing 160 is a fixed housing, preventing movement of the first ring gear 162 when the first ring gear 162 is meshed with the housing 160.

In the embodiment shown, a first input 156 is connected directly to the sun gear 163 to drive or rotate the sun gear 163. The ring gear 162 is fixed to the housing 160 and therefore does not rotate. Like the gearbox 52, the planet gear system 162 rotates about the sun gear 163, the input 56 is directly connected to the sun gear 63, and an output 157 is connected to the planetary gear system 62 with the ring gear 62 being fixed. The output 157 does not drive the pistons 54, 55, but rather acts as an input for the second planetary gear stage.

The second planetary gear stage is shown including a second ring gear 171, a second planetary gear system 172, and a second sun gear 173. The second planet gear system 172 includes a second plurality of separate planet gears. The second planet gear system 172 is meshed with and surrounding the second sun gear 173. The second planet gear system 172 is configured to rotate about the second sun gear 173. The second ring gear 171 is meshed with and surrounding the second planet gear system 172 such that the second planet gear system 172 is configured to rotate about the second ring gear 172. The second ring gear 171 is meshed with or otherwise attached to the housing 160. As shown, the output 153 is connected to the second planetary gear system 172. This output 153 may be the output provided to the pistons 54, 55.

The housing 160 is a fixed housing and may also surround the second ring gear 172. However, the schematic shown does not include the housing 160 being connected to the second ring gear 172. The housing 160 may be a structural protective housing but may not be configured to functionally integrate with the ring gears 161, 171, the planet gear systems 162, 172, or the sun gears 163, 173 to prevent rotation thereof. However, in other embodiments, one or both of the first ring gear 161 and the second ring gear 171 may be configured to be selectively affixed to the housing 160. The first and second ring gears 161, 171 may each be selectively and independently attached to the fixed housing 160 to prevent movement and fix the first and second ring gears 161, 171 in place.

The two-stage solvent pump gearbox 152 further includes a second input 156b that is attached to, connected to or otherwise provides rotational torque to the second ring gear 171 of the second stage. In other embodiments, the second input 156b may be attached to, connected to, or otherwise provide rotational torque to the first ring gear 161. As in the pumping system 20 described hereinabove, the rotational velocity of the first input 156a and the second input 156b may be independently controllable. The first input 156a may be configured to provide rotation in a first rotational direction, while the second input 156b may be configured to provide rotation in a second opposite rotational direction. In other embodiments, both inputs 156a, 156b may be configured to provide rotational input in the same rotational direction.

Figure 6:
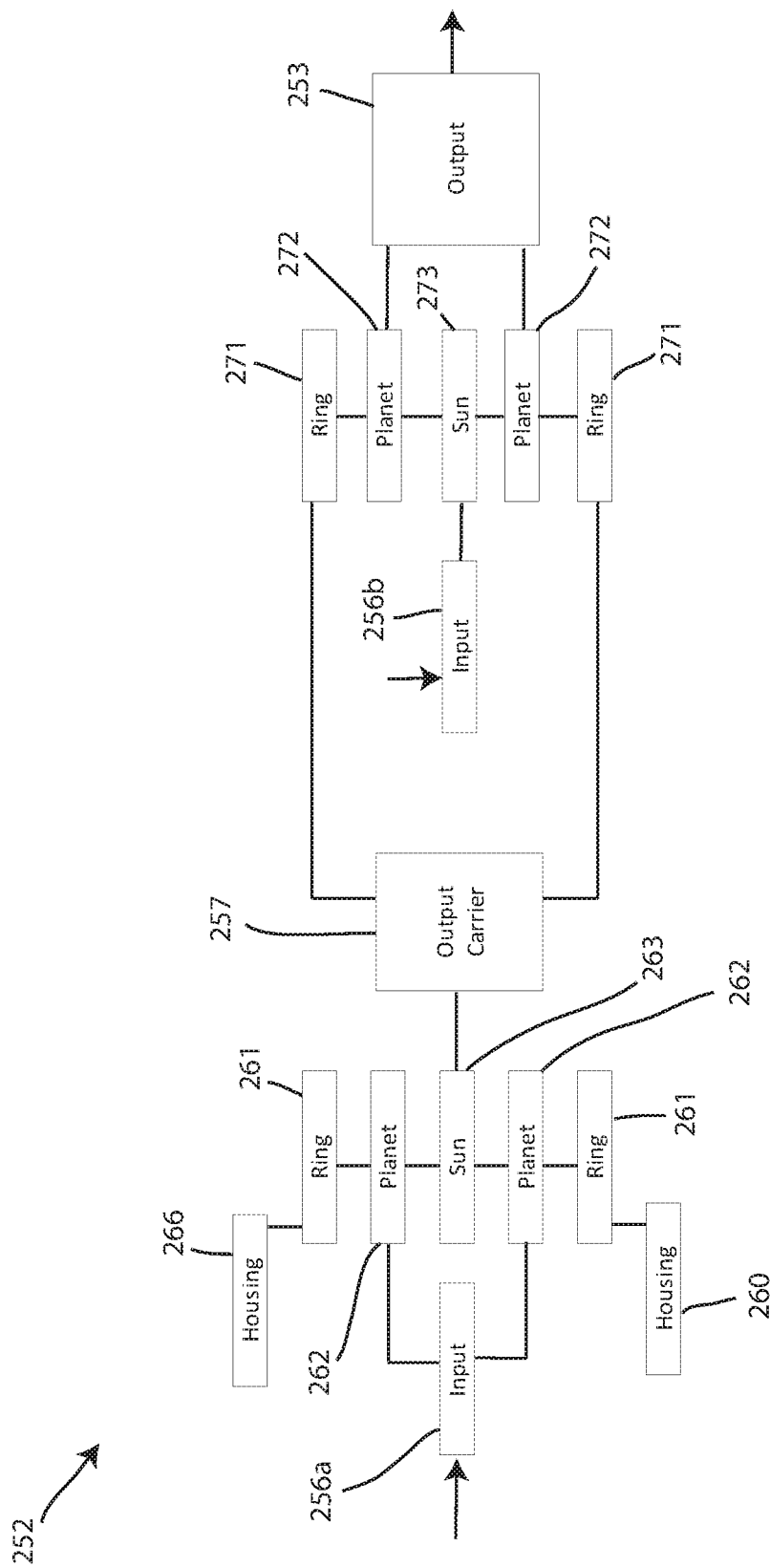
FIG. 6 depicts a schematic view of a solvent pump gearbox in accordance with one embodiment.
Figure 7:
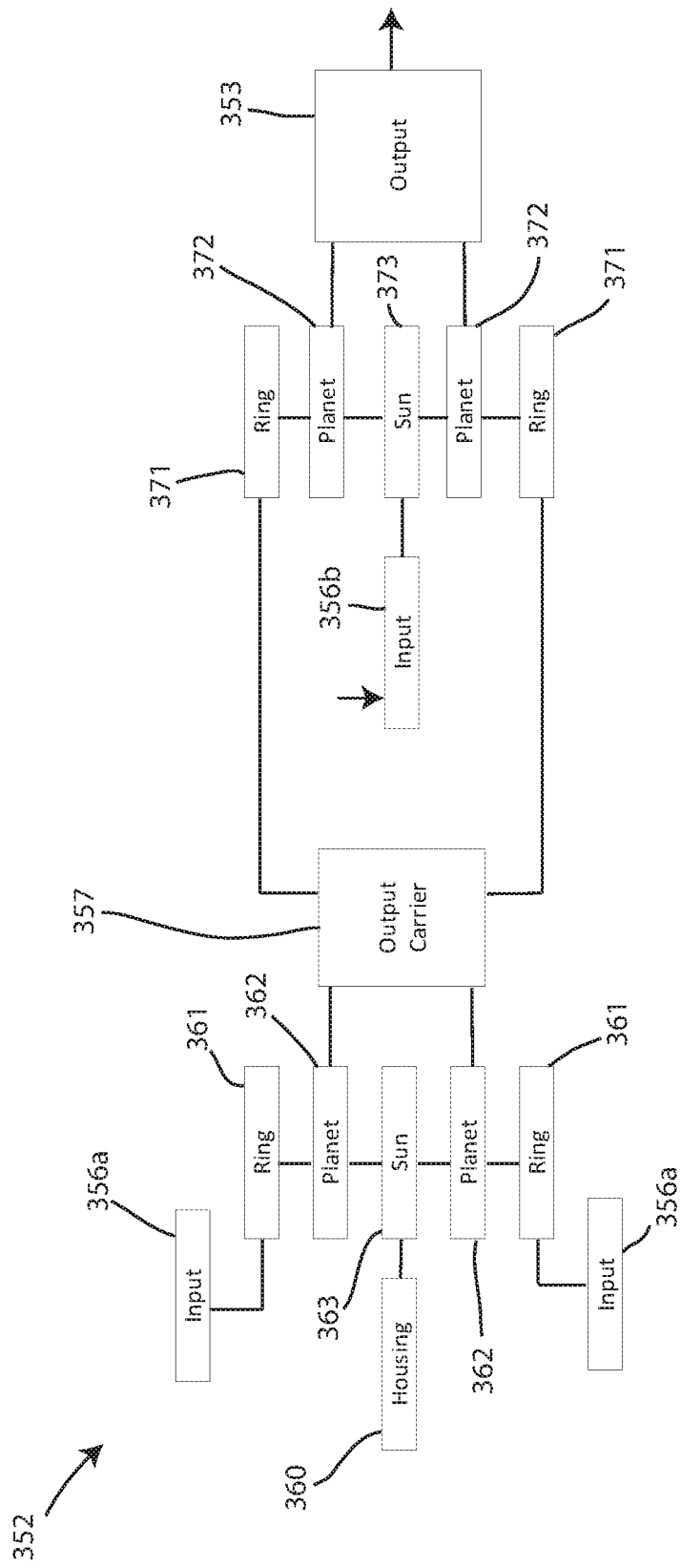
FIG. 7 depicts a schematic view of a solvent pump gearbox in accordance with one embodiment.

FIGS. 6 and 7 depict various schematic views of solvent pump gearboxes that might be provided. With respect to these systems, various torque and speed properties may be achieved by connecting inputs and outputs to the various gear components of the planetary gear system or stage. While these variations are shown with respect to two stage systems, these variations are also applicable to other multiple stage systems.

FIG. 6 depicts a schematic view of a solvent pump gearbox 252 in accordance with one embodiment. The solvent pump gearbox 252 includes a housing 260, a first stage of planetary gears including a first ring gear 261, a first planet gear system 262, and a first sun gear 263. The solvent pump gearbox 252 includes a second stage of planetary gears including a second ring gear 271, a second planet gear system 272, and a second sun gear 273. A first input 256a provides a rotary motion input to the first stage of planetary gears and a second input 256b provides rotary motion input to the second stage of planetary gears, while an output 253 carries a rotary motion output to the pistons of the pump system (not shown). The solvent pump gearbox 252 may replace the solvent pump gearbox 152 or 52 described herein above and incorporated into the pumping system 20 and any type of appropriate or desired liquid chromatography system.

Unlike the gearbox 152, the first input 256a of the solvent pump gearbox 252 is attached or otherwise integrated into the planetary gear system 262, which may include a plurality of separate planetary gears. Here, the output carrier 257 receives an input from the first sun gear 263 of the first stage and provides this rotary motion to the second ring gear 271 of the second stage. The second input 256b is applied to the second sun gear 273 of the second stage. The ring gear 261 is removably fixed to the housing 260 when the first stage of the system is configured to provide for a change in input-to-output gear ratio. The planet gear system 253 is rotated based on the input rotational motion applied to the second ring gear 271 and the second sun gear 273 to produce the output 253 to the pistons of the liquid chromatography solvent pump system.

FIG. 7 depicts a schematic view of a solvent pump gearbox 352 in accordance with one embodiment. The solvent pump gearbox 352 includes a housing 360, a first stage of planetary gears including a first ring gear 361, a first planet gear system 362, and a first sun gear 363. The solvent pump gearbox 352 includes a second stage of planetary gears including a second ring gear 371, a second planet gear system 372, and a second sun gear 373. A first input 356a provides a rotary motion input to the first stage of planetary gears and a second input 356b provides rotary motion input to the second stage of planetary gears, while an output 353 carries a rotary motion output to the pistons of the pump system (not shown). The solvent pump gearbox 352 may replace the solvent pump gearbox 152 or 52 described herein above and incorporated into the pumping system 20 and any type of appropriate or desired liquid chromatography system.

Unlike the gearbox 152, the first input 356a of the solvent pump gearbox 352 is attached or otherwise integrated into the first ring gear 361. Here, the output carrier 357 receives its input from the first planet gear system 362 of the first stage and provides this rotary motion to the second ring gear 371 of the second stage. The second input 356b is applied to the second sun gear 373 of the second stage. The sun gear 363 is removably fixed to the housing 360 when the first stage of the system is configured to provide for a change in input-to-output gear ratio. The planet gear system 353 is rotated based on the input rotational motion applied to the second ring gear 371 and the second sun gear 373 to produce the output 353 to the pistons of the liquid chromatography solvent pump system.

While the above schematic embodiments shown in FIGS. 6 and 7 depict exemplary dual stage systems, any dual input to single output two planetary gear stage gearbox system is contemplated. Still further, it is contemplated that two inputs are attached to two planetary components of the first stage, while the second stage is provided a single input through an output carrier, such as the output carrier 157, 257, 357, and a single output. Further, embodiments of the present invention may be applied to gearboxes having two stages, three stages, four stages, five stages, six stages or the like. The larger the number of stages, the more possible input-to-output gear ratios may be provided by the gearbox. This may be particularly advantageous if, for example, two motors are used each having a small optimum output range that needs to be running very close to the same speed to maintain resolution, precision or efficiency.

In still further embodiments, a continuously variable output drive system may be provided that only uses a single motor. Such a continuously variable output drive system may comprise a variable diameter pulley or belt, for example, which drives a continuously variable output from a single input. Still further, other embodiments contemplated may include pump systems that include a single piston, rather than two pistons. Still further, embodiments with more than two motors are contemplated, such as for use in more than one stage of gears.

Further contemplated are methods of pumping solvent in a liquid chromatography system, such as the liquid chromatography system 10, using a pumping system, such as the pumping system 20. Methods of pumping solvent in a liquid chromatography system may include providing a liquid chromatography solvent pump system comprising a continuously variable output drive system, such as the continuously variable output drive system 51, coupling at least one motor, such as the first and second motors 50a, 50b, and at least one piston, such as the primary piston 55 and the accumulator piston 54, the continuously variable output drive system including a gearbox, such as the gearbox 52. Methods may further include continuously varying the output from the gearbox to the at least one piston.

Methods may further include delivering a flow of solvent in a liquid chromatography system by the at least one piston with a flow rate determined at least partially by the output. Still further, methods may include using the liquid chromatography solvent pump in an analytical liquid chromatography system and also using the liquid chromatography solvent pump in a preparative liquid chromatography system.

Methods may further include providing, with a first motor, such as the first motor 50a, an input, such as the first input 56a, to a ring gear, such as the ring gear 61, and providing, with a second motor, such as the second motor 50b, an input, such as the second input 56b, to a sun gear, such as the sun gear 63.

Methods may further include operating, with a first motor, such as the first motor 50a, and a second motor, such as the second motor 50b, at least one of a first piston and a second piston, such as the pistons 54, 55, without reversing direction by the first motor and the second motor.

Methods may further include delivering, by the at least one piston, a flow of solvent in a liquid chromatography system having a chromatographic column greater than or equal to 1.5 mm and delivering, by the at least one piston, a flow of solvent in a liquid chromatography system having a chromatographic column less than or equal to 0.4 mm.

Methods may further include delivering, by the at least one piston, a flow of solvent at a rate greater than or equal to 1500 microliter per minute, and delivering, by the at least one piston, a flow of solvent at a rate less than or equal to 1 microliter per minute.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A liquid chromatography solvent pump comprising:
   at least one motor;
   a first piston;
   a second piston; and
   a continuously variable output drive system coupling the at least one motor to at least one of the first and second pistons, wherein the continuously variable output drive system includes a gearbox configured to provide a continuously variable output ratio between at least one input from the at least one motor and an output delivered to at least one of the first piston and the second piston and wherein the gearbox includes a planetary gear system,
   wherein the first piston and the second piston are configured to deliver a flow of solvent in a liquid chromatography system and wherein the first piston is a primary piston and wherein the second piston is an accumulator piston and wherein the continuously variable output drive system couples the at least one motor to the accumulator piston.

2. The liquid chromatography solvent pump of claim 1, wherein the at least one motor is a first motor and a second motor.

3. The liquid chromatography solvent pump of claim 2, wherein the gearbox includes a stage of gears comprising:
   a sun gear;
   a plurality of planet gears meshed with and surrounding the sun gear and configured to revolve around the sun gear; and
   a ring gear meshed with and surrounding the plurality of planet gears, wherein the plurality of planet gears are configured to revolve within the ring gear.

4. The liquid chromatography solvent pump of claim 3, wherein the first motor and the second motor are configured to operate at least one of the first piston and the second piston without reversing direction.

5. The liquid chromatography solvent pump of claim 3, wherein the first motor is configured to provide an input to the ring gear and wherein the second motor is configured to provide an input to the sun gear.

6. The liquid chromatography solvent pump of claim 3, further comprising a second stage of gears, the second stage of gears comprising:
a second sun gear;
a second plurality of planet gears meshed with and surrounding the second sun gear and configured to revolve around the second sun gear;
a second ring gear meshed with and surrounding the second plurality of planet gears, wherein the second plurality of planet gears are configured to revolve within the second ring gear; and
a second carrier connecting the second plurality of planet gears, wherein the carrier provides an input to the second sun gear, and wherein the second carrier provides an output to at least one of the first piston, the second piston, and a third sun gear of a third stage of gears.

7. The liquid chromatography solvent pump of claim 1, wherein the continuously variable output drive system, the first piston and the second piston are configured to deliver the flow at a rate and accuracy that enables use of the liquid chromatography solvent pump in both analytical and preparative liquid chromatography systems.

8. The liquid chromatography solvent pump of claim 1, wherein the continuously variable output drive system, the first piston and the second piston are configured to deliver the flow at a rate and accuracy that enables use of the liquid chromatography solvent pump in liquid chromatography systems having chromatographic columns greater than or equal to 1.5 mm and systems having chromatographic columns less than or equal to 0.4 mm.

9. The liquid chromatography solvent pump of claim 1, wherein the variable output drive system, the first piston and the second piston are configured to deliver accurate flow rates equal to or greater than 1500 microliter per minute and equal to or less than 1 microliter per minute.

10. The liquid chromatography solvent pump of claim 5, further comprising a carrier connecting the plurality of planet gears, wherein the carrier comprises an output from the plurality of planet gears.

11. A method of pumping solvent in a liquid chromatography system, the method comprising:
providing a liquid chromatography solvent pump comprising a continuously variable output drive system coupling at least one motor and a first piston and a second piston, the continuously variable output drive system comprising a gearbox, wherein the first piston is a primary piston and wherein the second piston is an accumulator piston and wherein the continuously variable output drive system couples the at least one motor to the accumulator piston, and wherein the gearbox includes a planetary gear system;
continuously varying the output from the gearbox to the at least one piston; and
delivering a flow of solvent to the liquid chromatography system with the liquid chromatography solvent pump.

12. The method of claim 11, further comprising delivering a flow of solvent in a liquid chromatography system by the at least one piston with a flow rate determined at least partially by the output.

13. The method of claim 11, further comprising:
using the liquid chromatography solvent pump in an analytical liquid chromatography system; and
using the liquid chromatography solvent pump in a preparative liquid chromatography system.

14. The method of claim 11, wherein the liquid chromatography solvent pump further includes:
a first motor; and
a second motor,
and wherein the gearbox further includes:
a sun gear;
a plurality of planet gears meshed with and surrounding the sun gear and configured to revolve around the sun gear; and
a ring gear meshed with and surrounding the plurality of planet gears, wherein the plurality of planet gears are configured to revolve within the ring gear,
the method further comprising:
providing, with the first motor, an input to the ring gear; and
providing, with the second motor, an input to the sun gear.

15. The method of claim 11, wherein the liquid chromatography solvent pump further includes:
a first motor; and
a second motor,
and wherein the gearbox further includes:
a sun gear;
a plurality of planet gears meshed with and surrounding the sun gear and configured to revolve around the sun gear; and
a ring gear meshed with and surrounding the plurality of planet gears, wherein the plurality of planet gears are configured to revolve within the ring gear,
the method further comprising:
operating, with the first motor and the second motor, at least one of the first piston and the second piston without reversing direction by the first motor and the second motor.

16. The method of claim 11, further comprising:
delivering, by the at least one piston, a flow of solvent in a liquid chromatography system having a chromatographic column greater than or equal to 1.5 mm; and
delivering, by the at least one piston, a flow of solvent in a liquid chromatography system having a chromatographic column less than or equal to 0.4 mm.

17. The method of claim 11, further comprising:
delivering, by the at least one piston, a flow of solvent at a rate greater than or equal to 1500 microliters per minute; and
delivering, by the at least one piston, a flow of solvent at a rate less than or equal to 1 microliters per minute.

18. A liquid chromatography system comprising:
a solvent delivery system, including:
a pump comprising:
at least one motor;
a first piston;
a second piston; and
a continuously variable output drive system coupling the at least one motor to the first and second pistons, wherein the continuously variable output drive system includes a gearbox configured to provide a continuously variable output ratio between at least one input from the at least one motor and an output delivered to at least one of the first piston and the second piston and wherein the gearbox includes a planetary gear system,
wherein the first piston and the second piston are configured to deliver a flow of solvent in a liquid chromatography system, and wherein the first piston is a primary piston and wherein the second piston is an accumulator piston and wherein the continuously variable output drive system couples the at least one motor to the accumulator piston;
a sample delivery system in fluidic communication with solvent delivery system;
a liquid chromatography column located downstream from the solvent delivery system and the sample delivery system; and
a detector located downstream from the liquid chromatography column.

* * * * *